US011748499B2

United States Patent
Sakowicz et al.

(10) Patent No.: US 11,748,499 B2
(45) Date of Patent: Sep. 5, 2023

(54) ASYNCHRONOUS AUTHORIZATION OF APPLICATION ACCESS TO RESOURCES

(71) Applicant: Microsoft Technology Licensing, LLC, Redmond, WA (US)

(72) Inventors: Jeffrey Thomas Sakowicz, Seattle, WA (US); Adam James Steenwyk, Redmond, WA (US); Zawad Chowdhury, Seattle, WA (US); Philippe Signoret, Auvergne-Rhône-Alpes (FR); Luis Carlos Leon Plata, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 394 days.

(21) Appl. No.: 17/030,025

(22) Filed: Sep. 23, 2020

(65) Prior Publication Data

US 2022/0092197 A1    Mar. 24, 2022

(51) Int. Cl.
*G06F 21/62* (2013.01)
*G06F 9/50* (2006.01)

(52) U.S. Cl.
CPC ............ *G06F 21/62* (2013.01); *G06F 9/5027* (2013.01)

(58) Field of Classification Search
CPC ..... G06F 21/62; G06F 9/5027; G06F 21/6218
See application file for complete search history.

(56) References Cited

U.S. PATENT DOCUMENTS

| 6,567,108 B1 * | 5/2003 | Master | G06Q 10/10 715/962 |
| 2009/0055891 A1 * | 2/2009 | Okamoto | H04L 63/101 726/1 |
| 2015/0020151 A1 * | 1/2015 | Ramanathan | H04L 63/20 726/1 |
| 2018/0063129 A1 * | 3/2018 | Aigner | H04L 63/0853 |
| 2018/0115551 A1 * | 4/2018 | Cole | H04L 63/083 |
| 2019/0238427 A1 * | 8/2019 | Guan | H04L 43/0876 |
| 2021/0250360 A1 * | 8/2021 | Patterson | H04L 63/108 |

OTHER PUBLICATIONS

Martin, et al., "Configure the admin consent workflow (preview)", Retrieved from: https://docs.microsoft.com/en-us/azure/active-directory/manage-apps/configure-admin-consent-workflow, Oct. 29, 2019, 8 Pages.
Hardt, Dick, "The OAuth 2.0 Authorization Framework", https://tools.ietf.org/pdf/rfc6749.pdf, Oct. 2012, 76 Pages.

* cited by examiner

*Primary Examiner* — Teshome Hailu
*Assistant Examiner* — Yohannes Wallelign Minwuyelet
(74) *Attorney, Agent, or Firm* — Mannava & Kang, P.C.

(57) ABSTRACT

According to examples, an apparatus may include a processor that may access a request for access by an application to a resource and may record the request in a data store. The processor may also identify an authorized entity to evaluate the request and output a notification to the authorized entity to evaluate the request, in which the authorized entity is to evaluate the request asynchronously with submission of the request by the application. In addition, the processor may determine whether a response is received from the authorized entity and, based on a determination that the response is received, may reject or grant the request based on the response and clear the record of the request from the data store.

17 Claims, 5 Drawing Sheets

ASYNCHRONOUS AUTHORIZATION OF APPLICATION ACCESS TO RESOURCES

BACKGROUND

Various types of applications may request access to protected resources such as private data, confidential data, user-owned data, and/or the like. The applications may request access to such protected resources to, for instance, provide integrated experiences to users. Prior to accessing the protected resources, the applications may send the owner of the protected resources requests for access grants to the protected resources. In addition, the applications may be prevented from accessing the protected resources unless the owner grants the applications access to the protected resources. Once granted, authorization processes may be implemented for the applications to access the protected resources.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are systems, apparatuses, methods, and computer-readable media in which a processor may manage the granting of access by an application to a resource by an authorized entity, in which the authorized entity may manage the granting of the access asynchronously with submission of a request by the application for the access to the resource. The authorized entity may manage the granting of the access asynchronously with the request submitted by the application in that the authorized entity may grant or deny the request at a time that differs from when the access by the application to the resource is sought. Instead, in some examples, a user may be interacting with the application at the time that the application sends the request for access to the resource. The decision as to whether to grant the access may be synchronous with the request in instances in which the user is authorized to make that decision or if another entity is able to make that decision when the application submitted the request. In other examples, the application may not be interacting with any users and may instead, for instance, execute as a background application. In these examples, the decision to grant access to the resource may normally be asynchronous with the submission of the request for the access.

In some instances, an organization may have in place a policy, such as a certain business logic, that may require a multi-step approval process in which the user who is interacting with the application may not be authorized to grant the access to the resource. For instance, the user who is interacting with the application may not be the owner of the resource, but instead, the organization, a group of users, or another user may own the resource. As a result, the user may not be authorized to grant access to the resource, for instance, for security purposes, for access restriction purposes, or the like. Instead, according to examples of the present disclosure, an entity may be designated as being authorized to approve or reject the request for access to the resource.

Through implementation of the features of the present disclosure, an application may be granted access to a resource without requiring that a user be present or authorized to respond to an access request interactively. Instead, the application may be granted access to a resource at some time following the submission of the request. In addition, an authorized entity, such as an administrator, a director, or the like of an organization may grant or reject the application. In many instances, the authorized entity may be better suited than a user that interacts with the application to determine whether the application is to be granted access to the resource in that, for instance, the authorized entity may have better and/or increased training to identify applications that may pose threats to the user's computing device as well as threats to the organization. As a result, an organizational policy may require that only authorized entities may respond to requests for access to the resource.

In one regard, conventional techniques of granting access to applications to resources may be limiting in that the access may be granted synchronously. As a result, a user may be required to grant or deny the access during an interaction with the application and/or an authorized entity may be required to grant or deny the access during the user's interaction or at another time at which the application requested the access. In addition, by enabling the user to grant the access, users may unknowingly or knowingly grant applications that may pose threats such as through submission of malicious code, denial of service attacks, and/or the like, access to the resources. A technical issue with conventional management of application access to resources may be that users may grant malicious actors access to protected resources. A technical solution afforded through the present disclosure may be that a network and the devices on the network may be better protected from malicious actors by preventing access to resources accessible through the network and/or devices on the network unless an authorized entity, who may be different from the user who may be performing a task that may result in the application requesting access to resources, may asynchronously, with respect to the submission of the request by the application, grant the access. Accordingly, the present disclosure may improve security on the resources as well as the network and devices on the network and may also prevent users of certain types, e.g., minors, from providing access to the applications.

Figure 1:
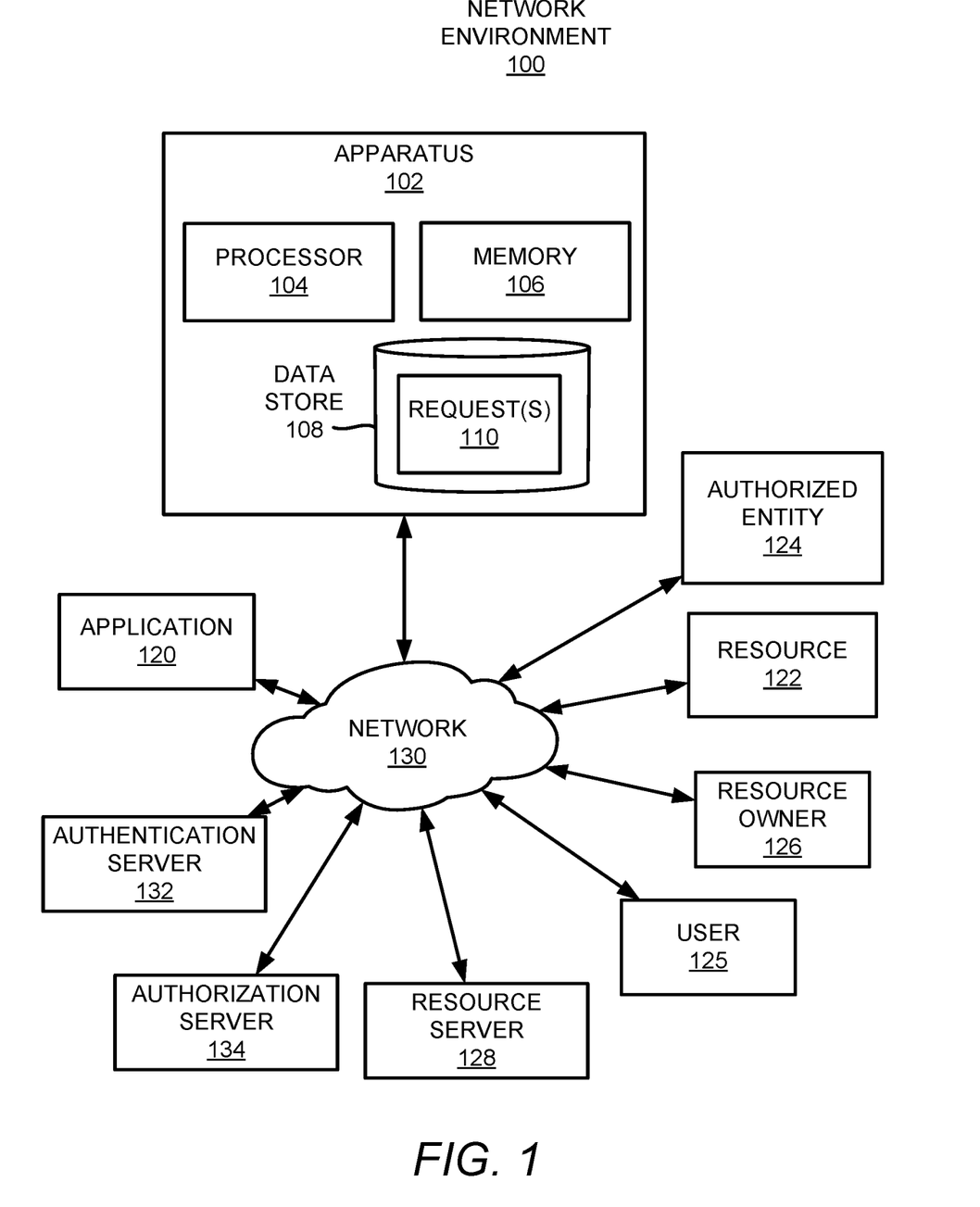
FIG. 1 shows a block diagram of a network environment, in which an apparatus may manage approval and rejection by an authorized entity of an access request by an application, in which approval or rejection by the authorized entity is asynchronous with submission of the request by the application, in accordance with an embodiment of the present disclosure.
Figure 2:
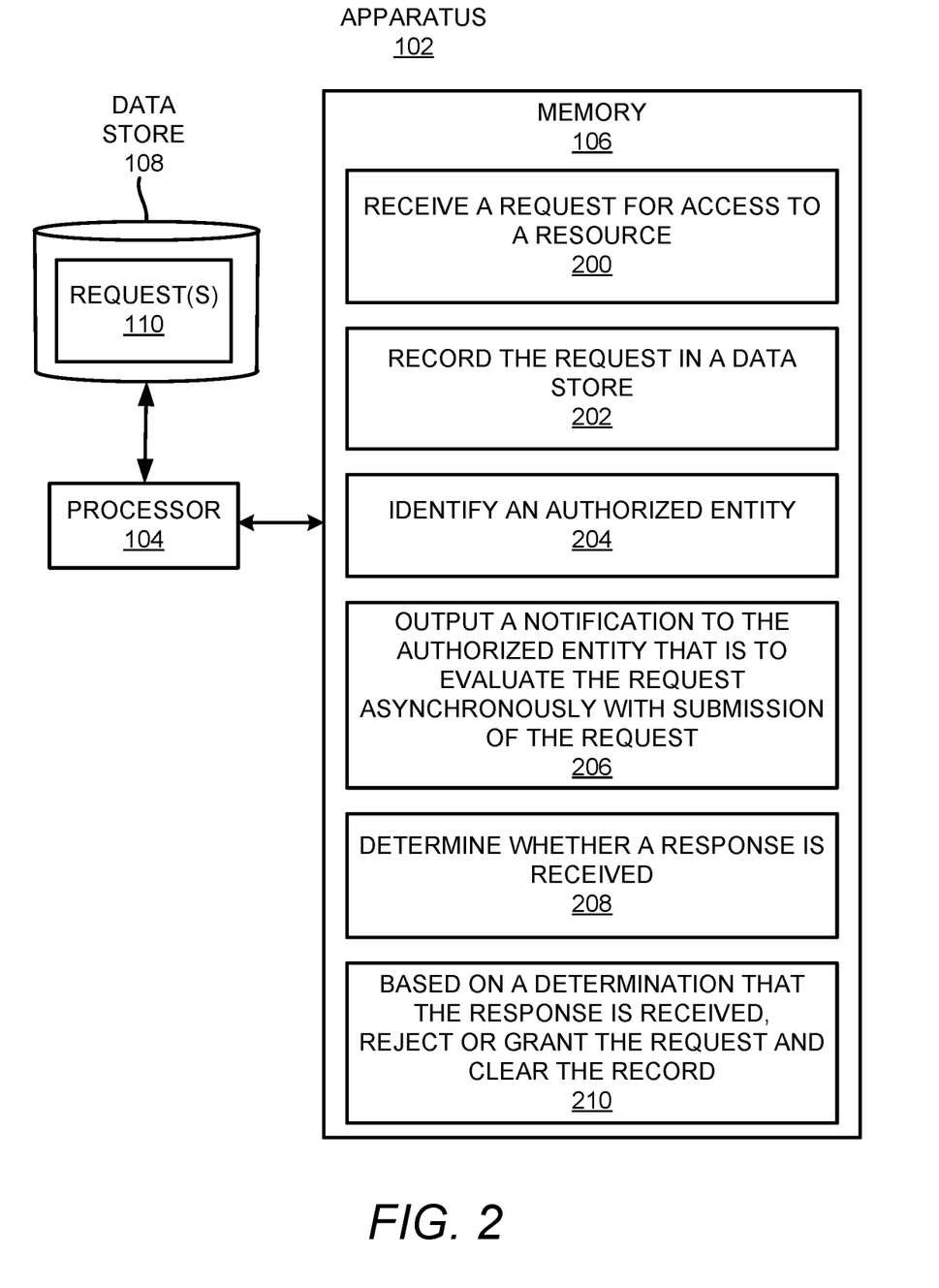
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may manage approval and rejection by an authorized entity of an access request by an application, in which approval or rejection by the authorized entity is asynchronous with submission of the request by the application, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 of the network environment 100 may include additional features and that some of the features described herein may be removed and/or modified without departing from the scopes of the network environment 100 and/or the apparatus 102.

According to examples, the apparatus 102 may be a server or other type of computing device, e.g., a network gateway, an access point, a network switch, and/or the like, to or through which an application 120 may submit a request 110 for access to a resource 122. The apparatus 102 may also manage the request, along with other requests in some examples, such that the request(s) 110 may be approved or rejected asynchronously with the submission of the request(s) 110 by the application 120. That is, for instance, the authorized entity 124 may determine whether to approve or reject the request 110 asynchronously with the submission by the application 120 to access the resource 122. Instead, for instance, a user 125 may, in some instances, synchronously approve or reject the request 110 with the submission of the request 110 by the application 120. That is, for instance, the user 125 may be interacting with the application 120 when the application 120 submits the request 110 to access the resource 122 and the user 125 may approve/reject the request 110. However, as discussed herein, the user 125 may not be authorized to grant the request 110.

In some examples, the user 125 may not own the resource 122, but instead, the resource owner 126 may be an entity, such as an individual, an organization, a group of individuals, and/or the like. In these examples, an organization may have in place a policy, such as a certain business logic, that may require a multi-step approval process in which the user 125 who is interacting with the application 120 may not be authorized to grant the access to the resource 122. Instead, an authorized entity 124 may be tasked with making request 110 approval decisions for users in the organization, in which the authorized entity 124 may be an administrator, a director, or the like of the organization. The organization, which may be a business, an educational institution, or the like, may institute such a policy to centralize reviews and decision making on access requests to, for instance, enhance security on the resource 122, network, servers, and/or the like. The organization may also or additionally institute such a policy to prevent or limit approval by certain types of users, such as minors.

In some examples, the apparatus 102 may store a pending request 110 for access to the resource 122 in a data store 108 such that the apparatus 102 may track whether the pending request 110 is approved or rejected over a duration of time. The authorized entity 124 may thus be given a certain length of time to approve or reject the request 110 such that the authorized entity 124 may make this determination at some time after the application 120 submitted the request 110 to access the resource 122. In this regard, the authorized entity 124 may make the determination asynchronously with the submission of the request 110.

The apparatus 102 may include a processor 104 that may control operations of the apparatus 102 and a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-210 that the processor 104 may execute. Although the instructions 200-210 are described herein as being stored on the memory 106 and may thus include a set of machine-readable instructions, the apparatus 102 may include hardware logic blocks that may perform functions similar to the instructions 200-210. For instance, the processor 104 may include hardware components that may execute the instructions 200-210. In other examples, the apparatus 102 may include a combination of instructions and hardware logic blocks to implement or execute functions corresponding to the instructions 200-210. In any of these examples, the processor 104 may implement the hardware logic blocks and/or execute the instructions 200-210. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to access a request 110 for access by an application 120 to a resource 122. The resource 122 may be, for instance, a protected resource such as user-owned data, private data, confidential data, company data, and/or the like. By way of particular examples, the resource 122 may include a user's work files, emails, calendar entries, personal files, personal information, confidential work-related information, confidential organization information, and/or the like. In addition, the application 120 may seek access to the resource 122 for any of a variety of reasons, such as, for instance, to provide users with an integrated experience with other applications that may have access to the resource 122, to make access to the resource 122 readily available through the application 120, to execute as a background application that may move files from one location to another, and/or the like.

In some instances, the application 120 may use a static set of base permissions to perform basic functions, in which other permissions may be required at a later time. For example, a user 125 may begin using an optional feature that may leverage a different resource, such as importing files into an application that was previously consuming calendar data. In this example, the application may request its base permission set upfront using a consent grant flow, and may later use "incremental consent" to request additional permissions. However, this may only be acceptable if the application continues to be used in an interactive manner after the initial signup/acquisition/deployment process is complete because a user may be required to be present to respond to the access request interactively. Where this model may fail may be a case where the application is granted a base set of permissions during the initial setup after which the application begins running in the background, and later, some event causes the application to require access to additional permissions. As discussed herein, an application 120 may request and may be granted the additional permissions without a user (e.g., an authorized user) being present to interactively grant the additional permissions. Instead, an authorized entity 124 may grant the permissions asynchronously with the request 110 for the permissions from the application 120.

In some examples, the application 120 may submit the request 110 directly to the apparatus 102 and/or to a service provided by the apparatus 102. In other examples, the application 120 may submit the request 110 to a user 125 of the application 120 and/or an owner 126 of the resource 122 and the processor 104 may intercept the request 110 or the user 125 or the resource owner 126 may forward the request 110 to the apparatus 102. In yet other examples, an attempted access to the resource 122 by the application 120 may trigger the submission of the request 110 to the apparatus 102 by, for instance, a resource server 128 that may provide and/or store the resource 122.

In any of the examples discussed herein, the apparatus 102 may access the request 110 through a network 130. The network 130 may be any suitable type of network through which the apparatus 102 may communicate with an authorized entity 124 as well as other entities in the network environment 100. As shown in FIG. 1, the other entities may include an authentication server 132 and an authorization server 134. The authentication server 132 may authenticate the application 120, the request 110, and/or the like, and the authorization server 134 may generate an authentication token that may enable the application 120 to access the resource 122. The network 130 may be the Internet, a wide area network, a local area network, and/or the like. In addition, for instance, the application 120 may access the resource 122 from the resource server 128 via the network 130 should the apparatus 102 approve the request 110 for access to the resource 122.

The processor 104 may execute the instructions 202 to record the request 110 in a data store 108. In some examples, the processor 104 may record the request 110 with other pending requests, e.g., requests for which instructions as to whether the requests have been approved or rejected have not been received. The processor 104 may also track the durations at which the pending requests have been recorded in the data store 108. In any regard, the data store 108 may be a Random Access memory (RAM), an Electrically Erasable Programmable Read-Only Memory (EEPROM), a storage device, or the like.

The processor 104 may execute the instructions 204 to identify an authorized entity 124 to evaluate the received request 110. In some examples, the processor 104 may identify the authorized entity 124 in instances in which the user 125 that is interacting with the application 120 may not have sufficient authorization to approve/deny the access request 110. As discussed herein, a determination as to whether the user 125 is authorized may be based on a set of business logic defined by an organization to which the user 125 may be a member. In instances in which the user 125 is authorized to approve/deny the request 110, the user 125 may synchronously approve/deny the request 110. That is, the user 125 may approve/deny the request 110 when the request 110 is received from the application 120.

In instances in which the user 125 is not authorized to approve/deny the request 110, the processor 104 may identify an entity, such as an administrator of an organization, an executive of an organization, an administrator of an institution, or other type of entity, that is authorized to evaluate the request 110. The authorized entity 124 may be authorized to evaluate the request 110 on behalf of (or in place of) the user 125 and/or the resource owner 126 as well as other members of the organization, institution, and/or the like. In some examples, an identifier of the authorized entity 124 may be stored in the data store 108 and the processor 104 may identify the authorized entity 124 by accessing the identifier of the authorized entity 124 from the data store 108. In any regard, the organization or institution may have in place business logic that may dictate that a multi-step approval process that may involve more than one person is to be implemented in evaluating whether a request 110 for access to a resource 122 by an application is to be approved or denied.

In some examples, a number of entities may be defined as authorized entities 124 and a listing of the authorized entities 124 may be stored, for instance, in the data store 108. An administrator or other entity within an organization, institution, and/or the like, may define the authorized entities 124. Certain ones of the authorized entities 124 may also be defined to evaluate requests corresponding to certain types of applications 120, requests corresponding to certain types of resource owners 126, requests corresponding to certain types of resources 122, and/or the like. In addition, the processor 104 may identify the authorized entity 124 that is to evaluate the request 110 through selection of the authorized entity 124 from the listing of the authorized entities 124. For instance, the processor 104 may identify the authorized entity 124 that is defined to evaluate the request 110 based on, for instance, the type of application 120 that is requesting the access, the type of the owner 126 that owns the resource 122, the type of the resource 122, the type of the user 125, and/or the like.

The processor 104 may execute the instructions 206 to output a notification to the authorized entity 124 to evaluate the request 110, in which the authorized entity 124 is to evaluate the request 110 asynchronously with submission of the request 110 by the application 120. The notification may be a push notification to a device of the authorized entity 124, an email message to the authorized entity 124, an entry in a queue of pending requests 110 displayed in a dedicated web portal or a mobile application that the authorized entity 124 may access, and/or the like. The processor 104 may access an identifier of the authorized entity 124 such as an email address, a name, an IP address, and/or the like stored on the data store 108 and may output the notification to the accessed identifier.

In some examples, the processor 104 may determine whether the user 125 has approved the seeking of approval from the authorized entity 124. In these examples, the processor 104 may send a message to the user 125 regarding whether the user 125 would like to seek approval for the request 110. The message may be a push notification to a device of the user 125, an email message to the user 125, and/or the like. In addition, the user 125 may respond via the push notification, an email message, and/or the like, with an indication that the user 125 approves or rejects the seeking of approval from the authorized entity 124. Based on receipt of an instruction from the user 125 to seek approval for the request 110, the processor 104 may output the notification to the authorized entity 124. In some examples, the user 125 may include an indication as to why the user 125 would like to seek approval for the request 110 from the authorized entity 124.

However, based on receipt of an instruction from the user 125 to not seek approval for the request 110, the processor 104 may not output a notification to the authorized entity 124. In addition, the processor 104 may reject the request 110 such that the application 120 may not be authorized to access the resource 122. Moreover, the processor 104 may clear the record of the request 110 from the data store 108. The clearing of the record may include deletion of the record, a modification to the record to indicate that the request 110 has been rejected, and/or the like.

The processor 104 may execute the instructions 208 to determine whether a response is received from the authorized entity 124. As discussed herein, the authorized entity 124 may determine whether to approve or reject the request asynchronously with the submission of the request by the application 120. To enable the authorized entity 124 to approve or reject the request 110 asynchronously with the submission of the request by the application 120, the processor 104 may track whether the request 110, a record of which may be stored in the data store 108, is approved or rejected over a duration of time. The processor 104 may thus provide the authorized entity 124 with a certain length of time to approve or reject the request 110 such that the authorized entity 124 may make this determination at some time after the processor 104 received or otherwise accessed the request 110 to access the resource 122.

In some examples, the processor 104 may initiate a timer set to a predefined duration responsive to the output of the notification. A user, an administrator, and/or the like, may define the predefined duration. In addition, the processor 104 may determine whether the response is received from the authorized entity 124 prior to expiration of the predefined duration. Based on a determination that the response is not received from the authorized entity 124 prior to expiration of the predefined duration, the processor 104 may output a reminder notification to the authorized entity 124. In addition, the processor 104 may initiate a second timer set to a second predefined duration responsive to the output of the reminder notification. The second predefined duration may be the same as or may differ from the predefined duration and may be user-defined.

The processor 104 may also determine whether the response is received from the authorized entity 124 prior to expiration of the second predefined duration. In addition, based on a determination that the response is not received prior to expiration of the second predefined duration, the processor 104 may reject the request 110 for access by the application 120 to the resource 122 and may clear the record of the request 110 from the data store 108. In other examples, the processor 104 may send a further notification or further notifications to the authorized entity 124 prior to rejecting the request 110.

The processor 104 may execute the instructions 210 to, based on a determination that the response is received, reject or grant the request 110 based on the response. The response from the authorized entity 124 may include an instruction to reject the request 110 or an instruction to grant the request 110. Based on a determination that the response includes an instruction to reject the request 110, the processor 104 may send a notification to the application 120 and/or the resource server 128 that the request 110 to access the resource 122 has been rejected. The processor 104 may also send a notification to the user 125 that the request 110 to access the resource 122 has been rejected. In any regard, the processor 104 may clear the record of the request 110 from the data store 108. For instance, the processor 104 may delete the record of the request 110 from the data store 108, may modify the record to indicate that the request 110 has been rejected, and/or the like.

However, based on a determination that the response includes an instruction to grant the request 110, the processor 104 may send a notification to the application 120 and/or the resource server 128 that the request 110 to access the resource 122 has been granted. In addition or alternatively, the processor 104 may initiate a grant of access by the application 120 to the resource 122. For instance, the processor 104 may submit an authorization grant for the application 120 to access the resource 122 to the authorization server 134, which may respond with an access token. The processor 104 may forward the access token to the application 120 and the application 120 may submit the access token to the resource server 128. The resource server 128 may respond to the application 120 with the resource 122. The processor 104 may also clear the record of the request 110 from the data store 108. For instance, the processor 104 may delete the record of the request 110 from the data store 108, may modify the record to indicate that the request 110 has been granted, and/or the like. The processor 104 may alternatively initiate the grant of access in other suitable manners.

Figure 3:
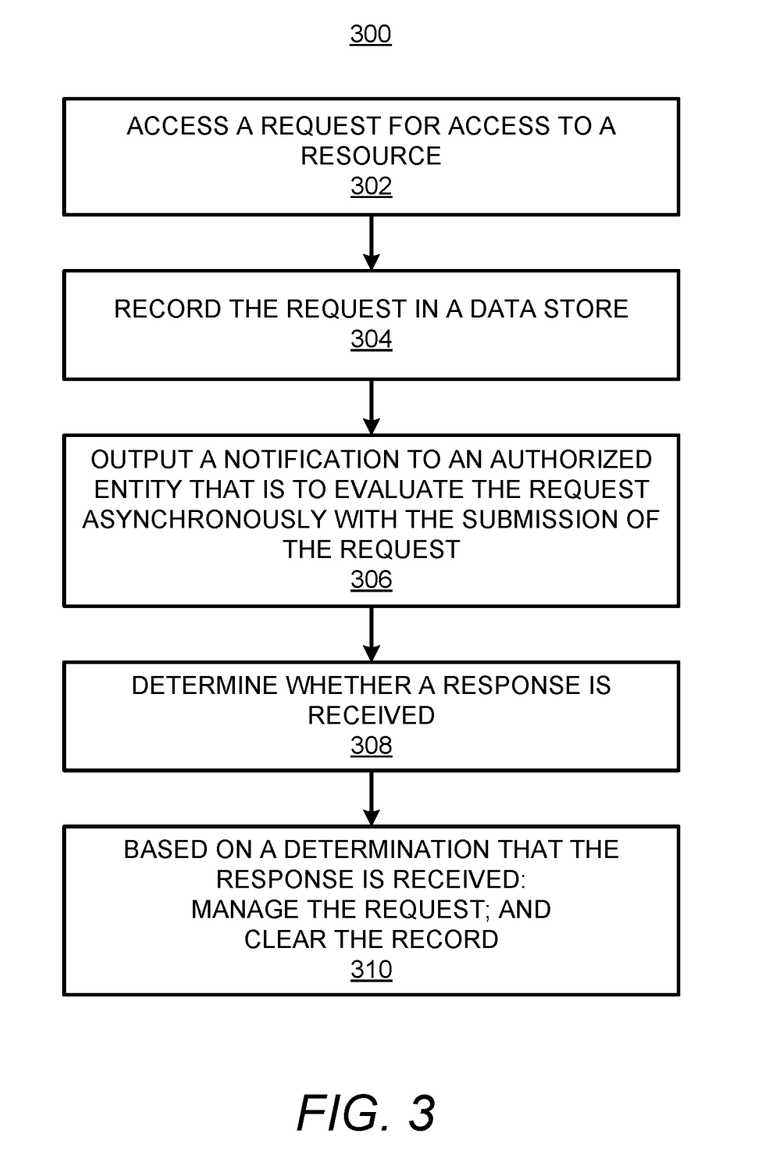
FIGS. 3 and 4, respectively, depict flow diagrams of methods for managing a request by an application for access to a resource, in which management of the request by an authorized entity is asynchronous with submission of the request by the application, in accordance with an embodiment of the present disclosure.
Figure 4:
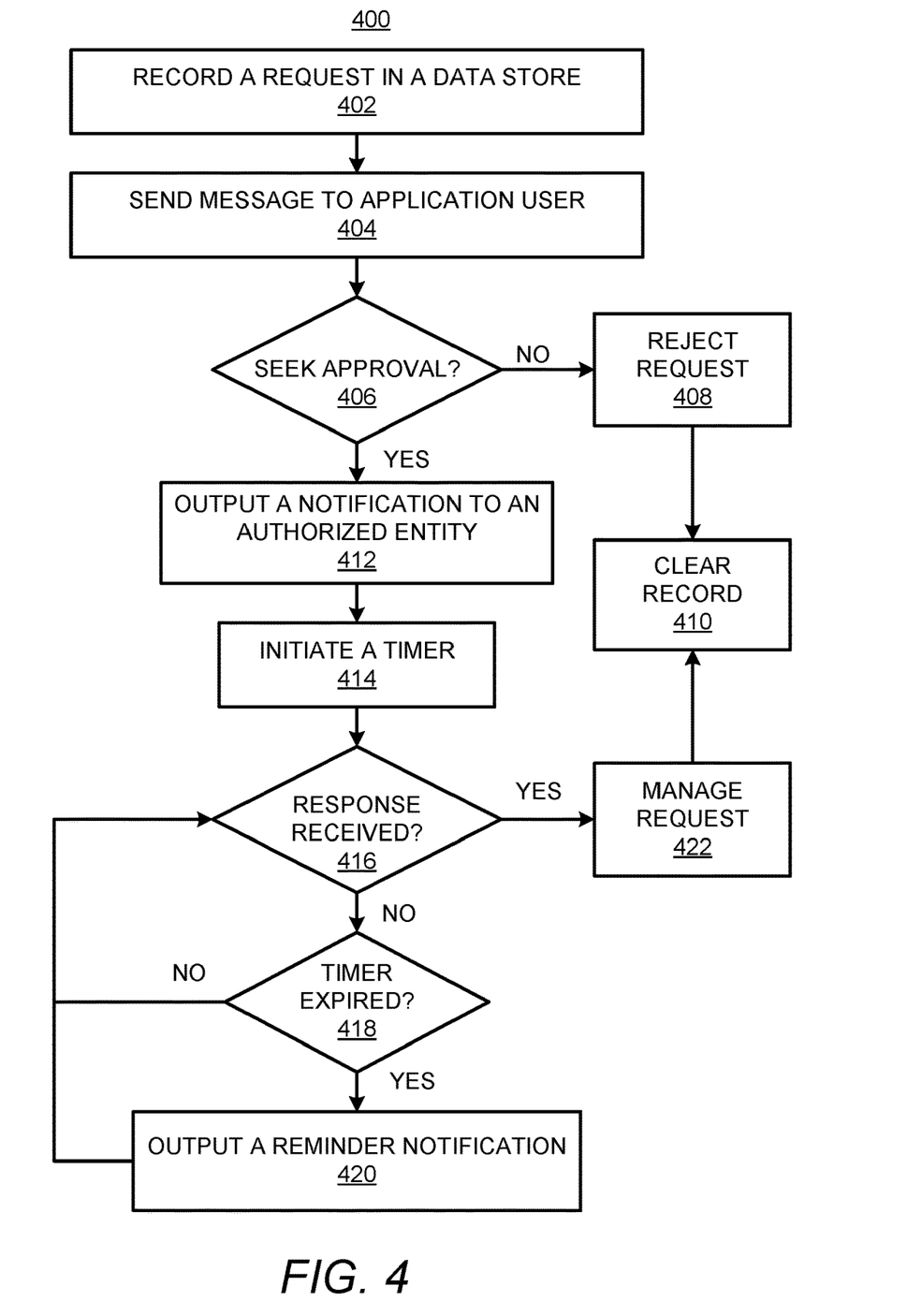

Various manners in which the processor 104 of the apparatus 102 may operate are discussed in greater detail with respect to the methods 300 and 400 respectively depicted in FIGS. 3 and 4. Particularly, FIGS. 3 and 4, respectively, depict flow diagrams of methods 300 and 400 for managing a request by an application 120 for access to a resource 122, in which management of the request by an authorized entity 124 is asynchronous with submission of the request by the application 120, in accordance with an embodiment of the present disclosure. It should be understood that the methods 300 and 400 may include additional operations and that some of the operations described therein may be removed and/or modified without departing from the scope of the methods 300 and 400. The descriptions of the methods 300 and 400 are made with reference to the features depicted in FIGS. 1 and 2 for purposes of illustration.

With reference first to FIG. 3, at block 302, the processor 104 may access a request 110 by an application 120 to access a resource 122. As discussed herein, the processor 104 may access the request 110 in any of a variety of manners. In addition, the resource 122 may be a protected resource.

At block 304, the processor 104 may record the request 110 in a data store 108. For instance, the processor 104 may record the request 122 as an entry among a plurality of pending requests.

At block 306, the processor 104 may output a notification to an authorized entity 124, in which the authorized entity 124 is to evaluate the request 110. That is, the notification may be outputted to the authorized entity 124 to notify the authorized entity 124 of the pending request 110 such that the authorized entity 124 may decide whether to approve or reject the request 110. In addition, the decision by the authorized entity 124 to approve or reject the request 110 may be asynchronous with the submission by the application 120 of the request 110. That is, for instance, when the processor 104 accessed the request 110 to access the resource 122 by the application 120, the authorized entity 124 may not currently be interacting with the application 120 and thus, the authorized entity 124 may be operating asynchronously with the application 120. Instead, for instance, the submission of the request 110 by the application 120 may be synchronous with interactions by the user 125 with the application 120 when the processor 104 accessed the request 110 to access the resource 122.

At block 308, the processor 104 may determine whether a response is received from the authorized entity 124. In addition, at block 310, the processor 104 may, based on a determination that the response from the authorized entity 124 is received, manage the request 110 based on the response. That is, the processor 104 may reject the request 110 based on the response from the authorized entity 124 including an instruction to reject the request 110. Alternatively, the processor 104 may initiate a grant of access by the application 120 to the resource 122 based on the response from the authorized entity 124 including an instruction to approve the request 110 as discussed herein. The processor 104 may also clear the record of the request 110 from the data store 108 as also discussed herein following either the rejection or approval of the request 110.

Turning now to FIG. 4, at block 402, the processor 104 may record, in a data store 108, a request 110 by an application 120 to access a resource 122, such as a protected resource. For instance, the processor 104 may record the request 122 as an entry among a plurality of pending requests in the data store 108.

At block 404, the processor 104 may send a message to the user 125 regarding whether the user 125 would like to seek approval by an authorized entity 124 for the request 110. The message may be a push notification to a device of the user 125, an email message to the user 125, and/or the like. In addition, the user 125 may respond via the push notification, an email message, and/or the like, with an indication that the user 125 approves or rejects the seeking of approval from the authorized entity 124. Based on receipt of an instruction from the user 125 to not seek approval for the request 110, at block 408, the processor 104 may reject the request 110. That is, the processor 104 may not output a notification to the authorized entity 124. In addition, at block 410, the processor 104 may clear the record of the request 110 from the data store 108. The clearing of the record may include deletion of the record, a modification to the record to indicate that the request 110 has been rejected, and/or the like. The method 400 may also end following block 410.

However, at block 406, based on receipt of an instruction from the user 125 to seek approval for the request 110, at block 412, the processor 104 may output the notification to the authorized entity 124. In some examples, the user 125 may include an indication as to why the user 125 would like to seek approval for the request 110 from the authorized entity 124.

At block 414, the processor 104 may initiate a timer set to a predefined duration responsive to the output of the notification. The predefined duration may be defined by a user, an administrator, and/or the like. In addition, at block 416, the processor 104 may determine whether the response. Based on a determination that the response is received, the processor 104 may manage the request 110 as indicated at block 422. In addition, the processor 104 may clear the record of the request 110 at block 410 and the method 400 may end.

However, based on a determination that the response is not received at block 416, the processor 104 may determine at block 418 whether the timer has expired. Based on a determination that the timer has not expired, the processor 104 may continue to track whether the response is received until the response is received or the timer has expired. Based on a determination that the timer has expired at block 418, the processor 104 may output a reminder notification to the authorized entity 124. In addition, the processor 104 may determine whether a response has been received at block 416. The processor 104 may also repeat blocks 416-420 until the response is received. In other examples, based on a failure to receive the response following a predefined number of iterations of blocks 416-420, the processor 104 may reject the request 110 and may clear the record. The predefined number of iterations may be user-defined. Additionally, instead of a predefined number of iterations, the processor 104 may reject the request 110 and may clear the record following a preset duration of time.

Some or all of the operations set forth in each of the methods 300 and 400 may be included as utilities, programs, or subprograms, in any desired computer accessible medium. In addition, each of the methods 300 and 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
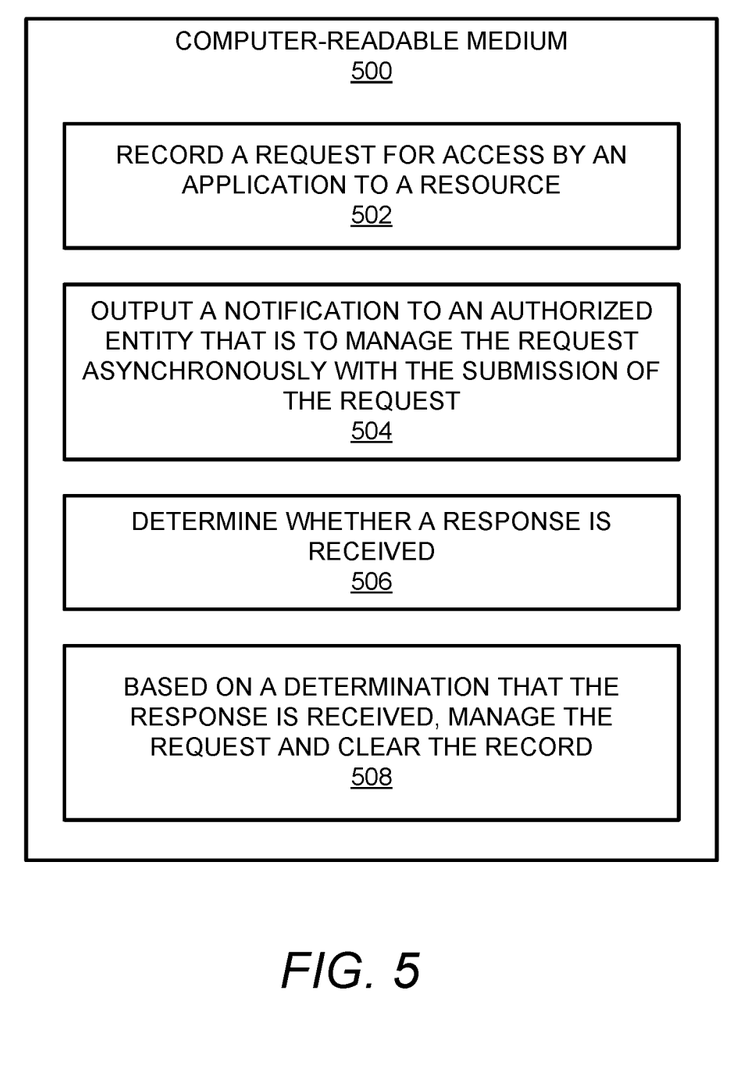
FIG. 5 depicts a block diagram of a computer-readable medium that may have stored thereon computer-readable instructions for managing a request by an application for access to a resource, in which an authorized entity is to manage the request asynchronously with the submission of the request by the application, in accordance with an embodiment of the present disclosure.

Turning now to FIG. 5, there is shown a block diagram of a computer-readable medium 500 that may have stored thereon computer-readable instructions for managing a request 110 by an application 120 for access to a resource 122, in which an authorized entity 124 is to approve or reject the request 110 asynchronously with submission of the request by the application 120, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-508 that a processor, such as the processor 104 depicted in FIGS. 1 and 2, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to record, in a data store 108, a request 110 for access by an application 120 to a resource 122 owned by a resource owner 126. A user 125 of the application 120 may be interacting with the application 120 when the processor received the request 110.

The processor may fetch, decode, and execute the instructions 504 to output a notification to an authorized entity 124, in which the authorized entity 124 is to determine whether the request 110 is approved or rejected asynchronously with submission of the request 110 by the application 120 and the authorized entity 124 is to return a response as to whether the request 110 is rejected or granted. In some examples, the processor may initiate a timer that may be set to a predefined duration responsive, e.g., after, the output of the notification. In these examples, the processor may determine whether the response is received prior to expiration of the predefined duration and may, based on a determination that the response is not received prior to expiration of the predefined duration, output a reminder notification to the authorized entity or reject the request. In other examples, the processor may, based on a determination that the response is not received prior to expiration of the predefined duration, output a reminder notification to the authorized entity 124 and may initiate another timer.

In some examples, prior to outputting the notification, the processor may send a message to the resource owner 126 regarding whether the resource owner 126 would like to seek approval for the request. In these examples, based on receipt of an instruction from the resource owner 126 to seek approval for the request 110, the processor may output the notification to the authorized entity 124. However, based on receipt of an instruction from the resource owner 126 to not seek approval for the request 110, the processor may reject the request 110 for access by the application 120 to the resource 120 and may clear the record of the request 110 from the data store 108.

The processor may fetch, decode, and execute the instructions 506 to determine whether the response is received from the authorized entity 124. In addition, the processor may fetch, decode, and execute the instructions 508 to, based on a determination that the response is received, manage the request 110 based on the response and clear the record of the request 110 from the data store 108. That is, based on the response including an instruction that the request 110 is approved, the processor may initiate a grant of access by the application 120 to the resource 122. However, based on the response including an instruction that the request 110 is rejected, the processor may output an indication that the request 122 has been rejected.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that cause the processor to:
  access a request for access by an application to a resource;
  record the request in a data store;
  identify an authorized entity to evaluate the request;
  output a notification to the authorized entity to evaluate the request, wherein the authorized entity is to evaluate the request asynchronously with submission of the request by the application;
  receive an indication from the authorized entity that the request is granted; and
  based on a determination that the request is granted,
    submit an authorization grant for the application to access the resource to an authorization server that is to respond with an access token;
    forward the access token to the resource to the application, wherein the application is to submit the access token to a resource server to access the resource; and
    clear the record of the request from the data store.

2. The apparatus of claim 1, wherein the instructions cause the processor to:
  initiate a timer set to a predefined duration responsive to the output of the notification;
  determine whether the response is received prior to expiration of the predefined duration; and
  based on a determination that the response is not received prior to expiration of the predefined duration, output a reminder notification to the authorized entity.

3. The apparatus of claim 2, wherein the instructions cause the processor to:
  initiate a second timer set to a second predefined duration responsive to the output of the reminder notification;
  determine whether the response is received prior to expiration of the second predefined duration; and
  based on a determination that the response is not received prior to expiration of the second predefined duration, reject the request for access by the application to the resource; and
  clear the record of the request from the data store.

4. The apparatus of claim 1, wherein the instructions cause the processor to:
  send a message to a user of the application regarding whether the user would like to seek approval for the request; and
  output the notification to the authorized entity based on receipt of an instruction from the user to seek approval for the request.

5. The apparatus of claim 4, wherein the instructions cause the processor to:
based on the receipt of the instruction from the user to not seek approval for the request,
reject the request for access by the application to the resource; and
clear the record of the request from the data store.

6. The apparatus of claim 1, wherein, to identify the authorized entity, the instructions cause the processor to:
select the authorized entity from a list of authorized entities.

7. The apparatus of claim 1, wherein the notification comprises:
a push notification to a device of the authorized entity;
an email message to the authorized entity; and/or
an entry in a queue of pending requests displayed in a dedicated web portal or a mobile application.

8. A method comprising:
recording, by a processor, in a data store, a request by an application to access a resource;
outputting, by the processor, a notification for an authorized entity to evaluate the request, wherein the authorized entity is to evaluate the request asynchronously with submission of the request by the application;
receiving, by the processor, an indication from the authorized entity that the request is granted; and
based on a determination that the request is granted,
submitting, by the processor, an authorization grant for the application to access the resource to an authorization server that is to respond with an access token;
forwarding, by the processor, the access token to the resource to the application, wherein the application is to submit the access token to a resource server to access the resource; and
clearing, by the processor, the record of the request from the data store.

9. The method of claim 8, further comprising:
initiating a timer set to a predefined duration responsive to the output of the notification;
determining whether the response is received prior to expiration of the predefined duration; and
based on a determination that the response is not received prior to expiration of the predefined duration, outputting a reminder notification to the authorized entity.

10. The method of claim 9, further comprising:
initiating a second timer set to a second predefined duration responsive to the output of the reminder notification;
determining whether the response is received prior to expiration of the second predefined duration; and
based on a determination that the response is not received prior to expiration of the second predefined duration,
rejecting the request for access by the application to the resource; and
clearing the record of the request from the data store.

11. The method of claim 8, further comprising:
sending a message to a user of the application regarding whether the user would like to seek approval for the request; and
outputting the notification to the authorized entity based on receipt of an instruction from the user to seek approval for the request.

12. The method of claim 11, further comprising:
based on receipt of an instruction from the user to not seek approval for the request,
rejecting the request for access by the application to the resource; and
clearing the record of the request from the data store.

13. The method of claim 8, further comprising:
identifying the authorized entity by selecting the authorized entity from a list of authorized entities.

14. The method of claim 8, wherein the notification comprises:
a push notification to a device of the authorized entity;
an email message to the authorized entity; and/or
an entry in a queue of pending requests displayed in a dedicated web portal or a mobile application.

15. A non-transitory computer-readable medium on which is stored computer-readable instructions that when executed by a processor, cause the processor to:
record, in a data store, a request for access by an application to a resource;
output a notification to an authorized entity, wherein the authorized entity is to evaluate the request asynchronously with submission by the application of the request and the authorized entity is to return a response as to whether the request is rejected or granted;
receive an indication from the authorized entity that the request is granted; and
based on a determination that the request is granted,
submit an authorization grant for the application to access the resource to an authorization server that is to respond with an access token;
forward the access token to the resource to the application, wherein the application is to submit the access token to a resource server to access the resource; and
clear the record of the request from the data store.

16. The non-transitory computer-readable medium of claim 15, wherein the instructions further cause the processor to:
initiate a timer set to a predefined duration responsive to the output of the notification;
determine whether the response is received prior to expiration of the predefined duration; and
based on a determination that the response is not received prior to expiration of the predefined duration,
output a reminder notification to the authorized entity; or
reject the request.

17. The non-transitory computer-readable medium of claim 15, wherein the instructions further cause the processor to:
send a message to a user of the application regarding whether the user would like to seek approval for the request;
based on receipt of an instruction from the user to seek approval for the request, output the notification to the authorized entity; and
based on receipt of an instruction from the user to not seek approval for the request,
reject the request for access by the application to the resource; and
clear the record of the request from the data store.

\* \* \* \* \*